May 9, 1933. J. L. ANDERSON 1,907,702
METHOD OF WELDING CIRCUMFERENTIAL SEAMS AND APPARATUS THEREFOR
Filed Dec. 16, 1929 6 Sheets-Sheet 1

INVENTOR
James L. Anderson
BY
ATTORNEY

May 9, 1933. J. L. ANDERSON 1,907,702
METHOD OF WELDING CIRCUMFERENTIAL SEAMS AND APPARATUS THEREFOR
Filed Dec. 16, 1929 6 Sheets-Sheet 6

Fig. 8.

INVENTOR
James L. Anderson
By J. F. Brandenburg
ATTORNEY

Patented May 9, 1933

1,907,702

UNITED STATES PATENT OFFICE

JAMES L. ANDERSON, OF TENAFLY, NEW JERSEY, ASSIGNOR TO AIR REDUCTION COMPANY, INCORPORATED, OF NEW YORK, N. Y., A CORPORATION OF NEW YORK

METHOD OF WELDING CIRCUMFERENTIAL SEAMS AND APPARATUS THEREFOR

Application filed December 16, 1929. Serial No. 414,408.

This invention relates to a method of welding circumferential seams between aligned sections of pipe or tubing, and to the apparatus for the performance thereof.

This invention has particular application in the assembly of varying lengths of large-diameter pipe sections into a continuous, substantially integral member. In the present-day manufacture of pipe, sections are made in standard lengths of approximately twenty feet. In the field, in order to reduce the costs of handling and installation, the erector orders pipe sections in lengths of forty feet or more. At the manufacturing plant where standard length pipe sections have been handled, it has been found that the costs of handling, testing, and like operations, are practically the same for a pipe section of forty feet as for one of twenty feet. The amount of scrap cut off each section, in finishing the pipe, is practically the same, whether twenty or forty foot sections are involved. In other words, in addition to reducing the handling and other costs, scrap is reduced fifty per cent. where the pipe section is increased to forty feet.

However, the processes involved in making pipe are such as to make almost prohibitive the installation of new apparatus for manufacturing the longer length pipe or tubing. One object of this invention is, therefore, to utilize the ordinary products of the pipe and tubing fabricators, that is, the short or standard lengths, and produce therefrom a long length product by which the main advantages set forth above may be attained.

For the purpose of carrying out this object of the invention, a method and apparatus therefor have been devised whereby the short lengths of pipe or tubing are brought into alignment and are thereafter welded into a single continuous member. The welding process thus applied is one involving fusion of the metal, more especially fusion produced by the oxyacetylene or high temperature flame.

In the practice of making up continuous lengths of pipe or tubing by welding the abutting ends, it has been attempted to align, within the chucks of a rotating device, the ends of the pipe sections to be welded. This process required clamping each pipe section individually within a chuck or chucks, with consequent necessity of, in some manner, bringing these clamped sections into accurate alignment. Moreover, on heating the metal for the welding operation, expansion naturally occurred, and the ends of the sections arranged in abutting relation when the chucks were closed would press against each other, either producing a welded joint reinforced to an undesirable extent or moving the sections against the anchoring effect of the clamps, so that control of the operation would be weakened or lost. The clamping of the two pieces required that the clamps be driven by synchronized mechanism. No provision was made for quick change of speed; at no time, as far as I am aware, was provision made for systematic preheating of the metal at the regions to be welded before the commencement of the welding operation.

Preheating the margins of the circumferential seam uniformly throughout its extent prior to the welding operation does not appear to have been practiced. In prior operations, heat was applied at one point to the cold metal of the seam margins. The metal at that point expanded; the rest of the metal remained in its cold, unexpanded condition. Great deforming stresses were created; a deformed structure, possibly exhibiting cracks and fissures, commonly resulted.

The defects previously inherent in mechanical welding made necessary the welding of circumferential seams by hand welding. Hand welding for a great number of reasons was uneconomical and inefficient. As is well known, a hand welding torch comprises a single tip from which generally issues but a single flame. The heating resulting from such single flame is necessarily limited, severely restricting the ultimate speed of welding. Irregularity of heating, non-uniformity of the area heated, improper timing and wire feeding, where a reinforced weld was to be produced, the non-continuous rotation of the pipe section, together with the fact that the weld was being formed along a surface of the sections of constantly varying angularity rather than at a point of constant angularity, which would tend to the formation of a uniform weld, all militated toward the production of an imperfect weld in an uneconomical, slow and slipshod manner.

Where the welding together of two pipe sections was carried out by a hand torch, a pipe having an appreciable bowing at the seam generally resulted. This effect is explained in that heat was applied at one point in the seam between the two sections until the metal at that point fused. In the interval necessary for such fusion, the metal immediately around that point at which heat was applied was heated and tended to expand. The least resistance to such expansion was offered in the direction of the metal becoming fluid; the expanding metal, therefore, moved in that direction, compressing the molten metal into a cross-section greater than that of the parent metal. The welding flame moved on, leaving the fluid metal actually greater in volume than the metal originally at the welding position. Quick congelation took place, the metal on either side of the molten metal being relatively extremely cold. The volume of metal which had been forced into the region of the weld had also contributed to the molten metal at the weld; by reason of the rapidity of cooling, the excess metal was not afforded an opportunity to return to its original state. An upset joint was left behind.

The parent metal, contiguous to the upset joint, had been reduced both in section and length by the upsetting action. When the effective flames had passed along, the contractive stresses arising from cooling became active. The portions of the parent metal which had been depleted by the described effect of the expansive stresses now tended to contract to a length less than that of the original metal. The substantially cold metal on the other parts of the seam remaining at the original length, a bowing or bending force became active at the welded portion of the seam, tending to move the sections toward each other at this point. If both sections were clamped, as in mechanical welding these stresses tended to tear the pipe out of the clamps, and thus to produce the defects noted. Invariably, a separate straightening operation was necessary after such welding of pipe sections was completed.

It is an object of this invention to provide a method of welding pipe sections together at their ends in which disadvantageous effects of expansion of the article to be welded in relation to the devices used for holding the article in the welding position, or in relation to the size and type of weld obtained, are either eliminated or much reduced, and from which a straight product, devoid of destructive internal stresses, is manufactured.

In this method, two or more pipe sections are aligned and brought into end abutment, and by welding the pipe sections together at spaced intervals along the seam thus formed a substantial tie or bond is produced to secure the sections together and to resist any stresses tending to move the edges out of alignment, or toward or away from each other. One of the sections is clamped and rotative power is applied to the clamp or clamps, while preferably a plurality of oxy-acetylene flame jets are directed at the region of the unclosed seam along the abutting ends. The pipe section not directly rotated is, however, secured to the rotated section by an integral bond, and will rotate as a unit with the clamped section. By the use of a plurality of flame jets, arranged in a graduated series to bring the metal at the seam edges to fusion, the time required for welding such means is reduced out of proportion to the increase of heating gases used, since the time interval and the boundary area for dissipation of heat is sharply reduced. By this time reduction, the undesired upsetting of the seam metal is appreciably decreased because of the more general heating of such edges within a given period of time, as against the very localized heating effected by a single flame tip.

The unclamped section is carried upon rollers which are in substantially accurate alignment with the clamps for the clamped section. As the pipe sections are rotated and welding proceeds, the first effect will be that of the expansive stresses due to heating. These stresses will tend to bow the pipe section supported on the rollers downwardly, due to the increase in length along the top face of the sections, and thus throw the free section out of alignment with the clamped section. The effect of this tendency will appear in the upsetting of the metal at the seam edges of the sections as the aligned rollers resist these stresses. When the upset metal solidifies, and subsequent contractive stresses arise, a tendency to bow the roller-supported section upwardly will appear with a possible perceptible bowing as the freely supported section moves to assume this new position. However, as the sections continue to rotate, the rollers become effective upon the slightly disaligned pipe to bend it into proper alignment with the clamped section as welding proceeds. The bending of the sections into proper alignment is facilitated by the hot condition of the metal at the seam. After welding is completed, the rotation of the sections may be continued in order to complete, where necessary, the straightening of the pipe. The result is a straight final product, all portions of which will be in substantial alignment, without the subsequent necessity of a distinct straightening operation. Since but one pipe section is positively clamped, distortion arising from such causes as non-uniform clamping, where both sections are clamped, will be avoided; irregular heating and cooling, as in hand welding, is entirely eliminated.

The speed of rotation of the clamps is regulated at the commencement of the operation, so that the metal at the seam margins will be raised to a high heat, insufficient, however, to result in fusion. After the seam margins have attained the desired heat, the speed of rotation is reduced sufficiently so that the torch flames may now become effective to produce fusion of the metal at the seam as the pipe rotates past the torch. Weld metal fused from a wire may be added, particularly if the wall of the pipe is fairly thick. In such event, it is desirable to have prepared the seam edges for welding by beveling them so that when placed in abutment a groove into which the weld metal is melted would be provided.

Due to the integral bond between the sections, no substantial separation of the edges will occur during the welding operation. Expansive forces are non-effective for this purpose, since the unclamped section is carried loosely without being restrained in its longitudinal movement. The clamped section, and through it the other section or sections, are entirely under control during the operation, requiring no readjustment of the clamps.

A further object of the invention is to provide suitable apparatus for carrying out this process. In one embodiment of such apparatus, chucks are provided to receive a pipe section, the chucks being arranged in alignment with a number of rollers upon which pipe sections may be supported. The chucks used for clamping the single section are preferably constructed to permit movement of the pipe section into one end of the welding machine and out of the other, by movement transversely through the chucks. By aligning with these chucks a suitable number of rollers, a continuous pipe may be fabricated. After a pair of sections have been welded together, the clamped section is released and both sections rolled along, through the chucks until a free end is positioned at the welding apparatus. Another section may now be tacked to the free end, and the welding operation repeated. This process lends itself to the speedy erection of pipe lines in the field, all the joints of which are of the integral, fusion welded, type, in which case a welding machine made portable by mounting on skids or like means may receive at one end individual pipe sections and feed away a finished, continuous conduit. The step of tacking each section to the pipe may be carried out immediately before each successive welding operation, or the tacking may be done by first aligning the several sections in abutment externally of the machine and tacking all the contiguous edges together at properly located points. In such cases a series of rollers would be provided on the entry, as well as the discharge side of the welding machine. The speed of producing a conduit of any desired length from a single welding machine would thus be materially increased.

Means are provided for rotating the chuck or chucks, first at comparatively high speed, and then at comparatively low speed. This may be accomplished in various ways, but preferably these chucks are connected with a drive shaft, to which two distinct power sources may, by means of a clutching arrangement, be connected individually. One power source operates to drive the chucks at a speed such that the torch will be effective to heat the metal without fusing it; by using the other power source, the chucks will be driven at a speed slow enough that the metal will be fused under the heat of the torch. The clutch used in shifting from one power source to the other, or from one speed gear to another, is of such construction or is so coordinated with a brake that simultaneously with the shifting of the clutch there results a braking action on the part traveling at high speed. This effect is especially important in reducing the speed of the rotating pipe sections from the high preheating speed to the low welding speed. By apparatus of this character the momentum of a pipe section at the high preheating speed is readily reduced to that at the low welding speed without subjecting the drive mechanism and the power devices to appreciable stresses arising from the sudden speed changes. The braking action is important since the change of speed must be made as quickly as possible to facilitate the efficient use of the heat in the sections due to the preheating operation. It is thus feasible to control the momentum of large masses of metal in two or more bonded pipe sections.

The operation of welding together the end edges of such bodies as cylindrical pipe sections involves certain special considerations. Molten metal is being formed on a traveling sloping surface, the inclination of which varies at all points in its extent. The molten metal must be guarded against loss by running and being carried down the sloping side of the pipe; on the other hand these tendencies can be controlled and utilized to produce a highly successful weld.

The metal seeking to run down the side of the pipe is retained, as it becomes less fluid, by a wall set up by the solidification of other metal cooling along the seam. The metal, initially molten at the seam, tends to present a united surface of the greatest area, due to the effects of surface tension. As this molten metal is progressively removed from the effects of the heating flames, solidification at the remotest portion occurs; a wall is set up which presents a barrier against flow of the liquid metal down the side of the pipe. The position of this solidified wall on the curving slope is a determining factor in the type of weld produced. Its position will be determined by the diameter and wall thickness of the pipe section, the positioning of the flames relative to the crest of the curve, the speed of rotation, the number and size of the preheating and welding flames, and their distance from the surface. Varying the positioning of the heating agency with relation to the crest, that is to say, varying the inclination of the slope at the region of fusion, is a very effective means of regulating the height or fullness of the weld. In this method of welding, the principles laid down in my application Serial No. 246,451, filed January 13, 1928, which has, since the filing of this application, matured, on the 3rd day of June, 1930 into Patent No. 1,761,167, are applied. The flow of the molten metal under the control of surface tension and gravity may be governed and utilized so as to secure a weld of predetermined contour.

Further, in order to increase the speed of welding, the number and size of the preheating and welding flames may be increased to effect a greater total heat input per unit of time. For proper welding, in order to take advantage of the downwardly sloping wall of the pipe section to produce the contemplated fullness of the weld, it is necessary to bring molten metal to the crest and then permit it to form the desired weld, as before, under the influence of surface tension and gravity. Some or all of the flames may, to effect this result, be positioned on the upgoing side of the sections, the particular location of the flames relative to the crest of the pipe being a function of the number, size, spacing and arrangement of the flames, the speed of rotation, and the dimensions of the pipe section. In like manner the flames may be fixed in position while the speed of rotation is varied to arrive at the same end. Molten metal in some cases will be formed on the upgoing side of the pipe, its adhesion to the seam and the effects of surface tension providing tractive effort to assist the moving seam in transporting the metal, while still molten, to the crest from whence it will flow along the seam to form a weld of the desired fullness.

An object of this invention is, therefore, to provide a process and apparatus therefor for producing welds of the character set forth, in which means are provided for readily controlling the welding operation to compensate for the factors referred to.

In carrying out this part of the invention, adjusting apparatus is provided in connection with the welding apparatus to permit the positioning of the torch tip, and, therefore, of the welding flames, relatively to the seam being welded, so that the point where the weld is actually being produced can be shifted or kept stationary during the operation in accordance with the necessities of each situation. Thus, the torch can be shifted forwardly or rearwardly along the line of the circumferential seam, while the welding operation is in progress, in order to regulate with exactitude the relation or distance between the regions of fusion and the crest of the seam, or in other words to regulate the degree of slope where the metal is melted and where the weld is effected.

In mechanical welding, the torch for producing the welded joint was positioned between the two sets of chucks or clamps in which the individual pipe sections were clamped, and there resulted from this an awkward arrangement, in which the torch was scarcely accessible for ready adjustment, and in which the heat from the torch affected the chucks or clamps and the allied apparatus. In this apparatus, the torch, or where a number of welding operations are carried on simultaneously the torches, are located outside and preferably spaced away from all clamping devices. The location is such that accessibility for control, removal, and repair is attained, and the direct action of the torch flames on the machine parts is eliminated. Slight displacement of the seam due to expansion is compensated for by means for readily adjusting the torch laterally. In the particular arrangement of the apparatus, the operator of the machine can easily control the position of the flames with respect to the seam, and at the same time control the motors, the clutch, and the wire feeding device for the torch.

Other objects of this invention will appear from the specifications set forth or from the drawings, in which.

Figure 1:
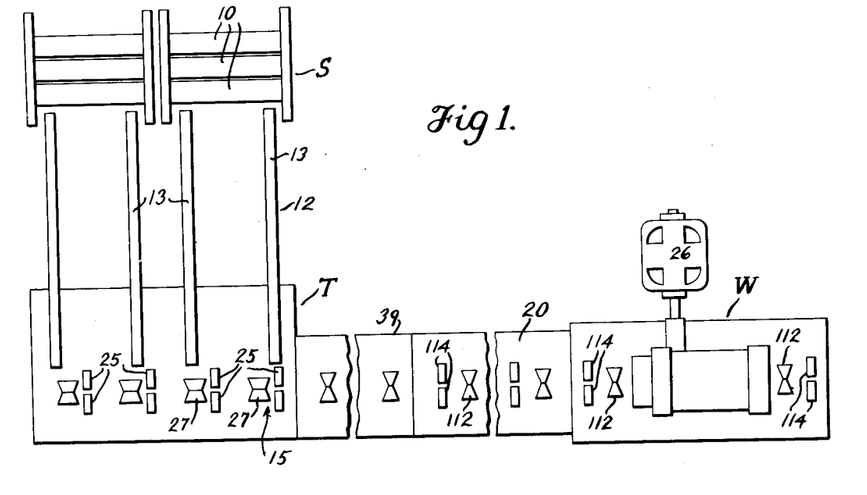
Fig. 1 is a schematic plan view of apparatus arranged to carry out the steps of a process embodying the invention.

In the drawings in which is disclosed an apparatus for carrying out the process involved in this invention, there is diagrammatically shown a storage rack S, from which pipe sections 10 are fed to a tacking table T. From this table the bonded sections pass to the welding machine W.

Assuming that the invention is used in a pipe making plant, the storage rack S represents the last portion of such a plant. The specific manner in which the lengths or sections of pipe, tube, or tubing are produced does not form a part of this invention, nor does it affect the manner of operation hereinafter set forth. The pipe sections fed to the tacking table T are brought into alignment, the ends brought into abutment, and an operator, either by means of a hand acetylene torch or in any other suitable manner such as arc welding, will weld the abutting edges of the pipe sections together at a plurality of spaced points along the seam thus formed. Three points have been found sufficient in pipe of about eight inches inside diameter, the extent of each weld being less than ¾ inch. By this operation, the pipe sections are secured together by a substantial integral bond; one section being positively clamped, the clamps are rotated; all the other sections bonded with the clamped section will be simultaneously moved.

The tacking table T may be constructed in any desired manner; in a preferred assembly it comprises a sloping runway 12 leading from storage racks S. The runway may be constructed of a plurality of I-beams 13, resting upon suitable foundations, extending longitudinally in parallel spaced relation, and inclined to the horizontal. At the lower end of each beam is secured in any suitable manner the roller mounting 15. This mounting consists of a pair of spaced channels 17, supported upon another pair of spaced channels 19. Channels 17 have the recesses 21 cut in their upper surface; in slots 23 extending downwardly therefrom the rollers 25 are provided bearings. A pipe section rolling down the runway will be restrained from falling upon rollers 25 by means of a suitable stop 14. This stop, as apparent from the drawings, is capable of operation to release one section to move upon the rollers while restraining the other sections from such movement.

Figure 2:
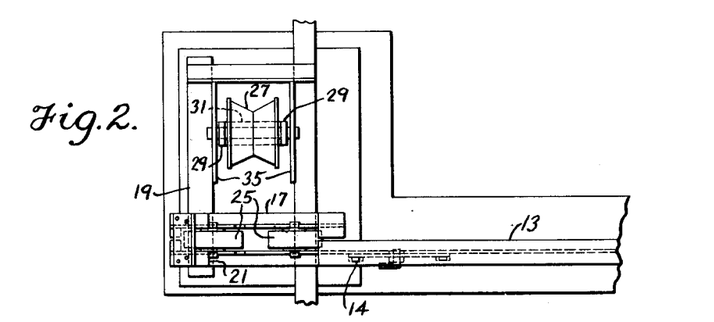
Fig. 2 is a fragmentary plan view of a portion of a support assembled with the tacking table.
Figure 3:
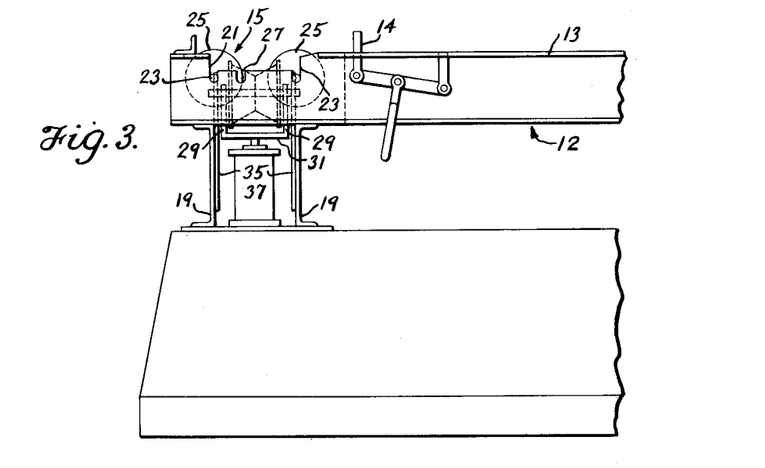
Fig. 3 is a side elevational view of the detail shown in Fig. 2.
Figure 4:
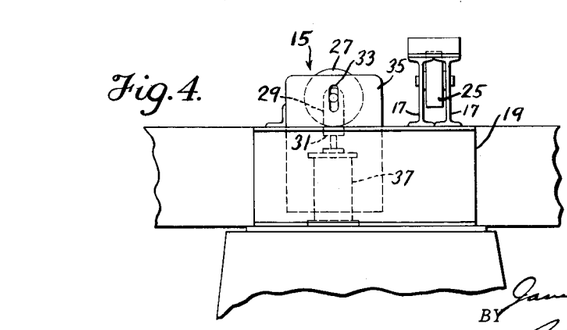
Fig. 4 is a front elevational view of said detail.

Runway 12 is preferably of sufficient width to permit the handling of at least two sections longitudinally thereof at one time. Rollers 27, mounted transversely of rollers 25, permit the ready movement of pipe sections transversely of the runway in facilitating the aligning and abutting steps necessary for the tacking operation. They are carried in bearings which are formed in the arms 29 of the U-shaped cross-head 31. The stub shafts of the rollers extend beyond the arms of the cross-head, and are guided within the vertical slots 33 provided in the plates 35 which may be secured to channels 19 in any desired manner. The cross-head 31 is directly connected with a lifting device such as the hydraulic cylinder 37, carried upon any suitable foundation, such as that of the runway itself. By arranging a number of rollers 27 in series, it is possible to speedily align a great number of pipe sections with ease, without increasing the dimensions of runway 12 beyond that of the length of one pipe section.

Normally, when in the lowered position, rollers 27 will be out of contact with any pipe section supported upon rollers 25. Handling of such sections for welding aligned edges is thus facilitated, as rollers 25 permit easy rotation of the pipe sections. After the tacking is finished, pressure is transmitted to cylinder 37, the sections lifted by rollers 27 away from rollers 25 and then shoved or otherwise moved along the rollers onto the conveyers 39 to welding machine W.

The rollers 25 are preferably arranged and made of suitable dimensions so that sections of pipe of the same diameter resting on the rollers, which are of course at the same level, will be positioned with their metallic portions in alignment. The use of clamping devices may thus be eliminated. However, jigs or similar clamping devices may be used during the tacking operation to assure complete alignment of the metallic portions of the pipe sections.

Figure 5:
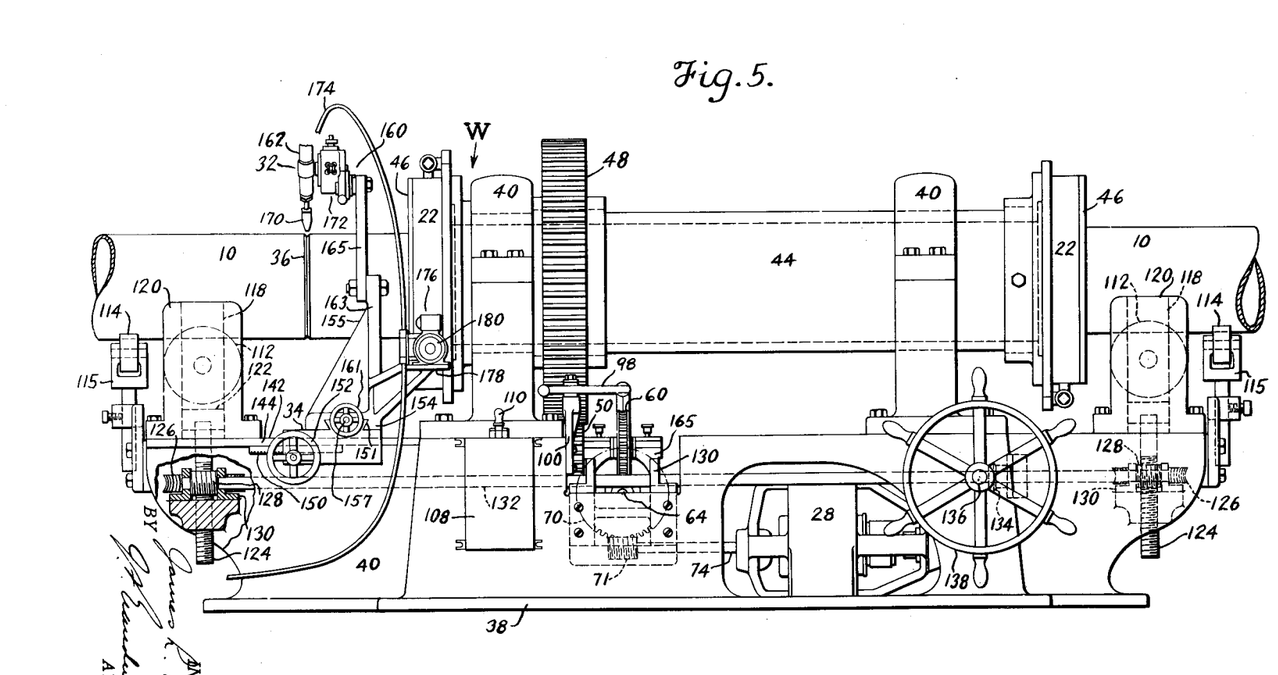
Fig. 5 is a front elevational view of a machine for mechanically welding pipe sections in end to end relation, portions being broken away to disclose details thereof.
Figures 6, 10:
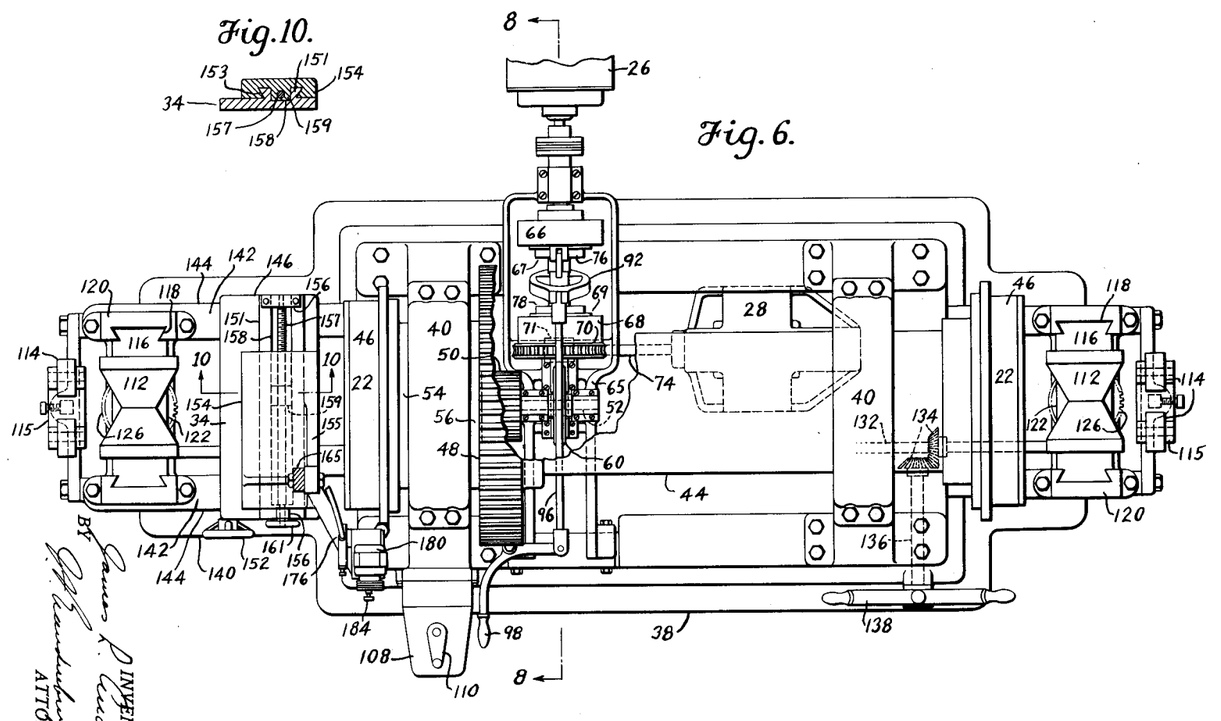
Fig. 6 is a plan view of said machine, details thereof being shown by breaking away portions of said machine.
Fig. 10 is a detail sectional view on the line 10—10 of Fig. 6 illustrating the assembly of the torch-positioning means.
Figure 7:
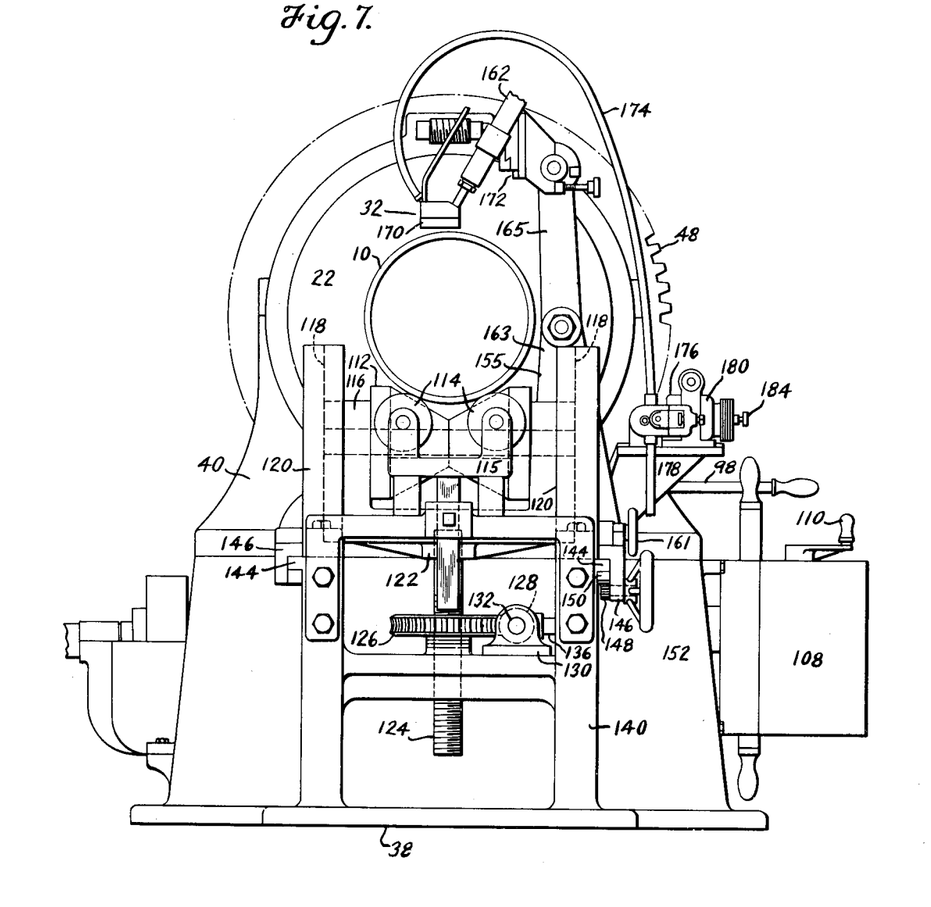
Fig. 7 is an end elevational view of said machine.

Welding machine W comprises a number of roller supports 20 in alignment with a clamping means 22, which as hereinafter set forth clampingly engages one of the bonded pipe sections 10 in position to be rotated. Driving means to rotate the clamping means at a number of different speeds may consist of a single motive device to which is connected a speed-reducing apparatus, by which a number of different speeds of the clamping means may be produced; however, in the preferred arrangement a high speed motor 26 and a low speed motor 28, coupled through a clutch assembly 30 with the clamping means, are used. A welding unit 32 supported on a carriage 34 is assembled with the clamping means 22, so that the seam 36 between contacting pipe sections may be welded closed while the clamping means are rotated.

Welding machine W is supported upon a base 38 which may be fixed in position upon a suitable foundation, or where the apparatus is to be used in the field may be supported upon skids or like devices. The base may be a single unitary member or may consist of a plurality of sections, each of which carries an individual part of the welding machine W, such as the clamping means 22, the welding unit 32, and each set of roller supports 20. Where the apparatus is supported upon a fixed foundation, base 38 preferably carries all the parts of the welding machine.

Bolted in spaced relation upon base 38 are the bearing standards 40. Carried in the bearings of standards 40 is a cylinder 44; the ends of the cylinder extend beyond the standards and receive the chucks 46 of clamping means 22, which are secured thereto in any preferred manner. Secured to cylinder 44 adjacent a standard 40 is a gear 48, which meshes with a driven gear 50 upon a countershaft 52. Enlarged hub portions 54 and 56 of check 46 and gear 48, respectively, engaging the standard 40, maintain the chucks in a predetermined position. The chucks are preferably of the multiple jaw type having a single control and adjusting means for simultaneously moving the jaws into clamping engagement with a pipe section passed through the chuck.

Figure 8:
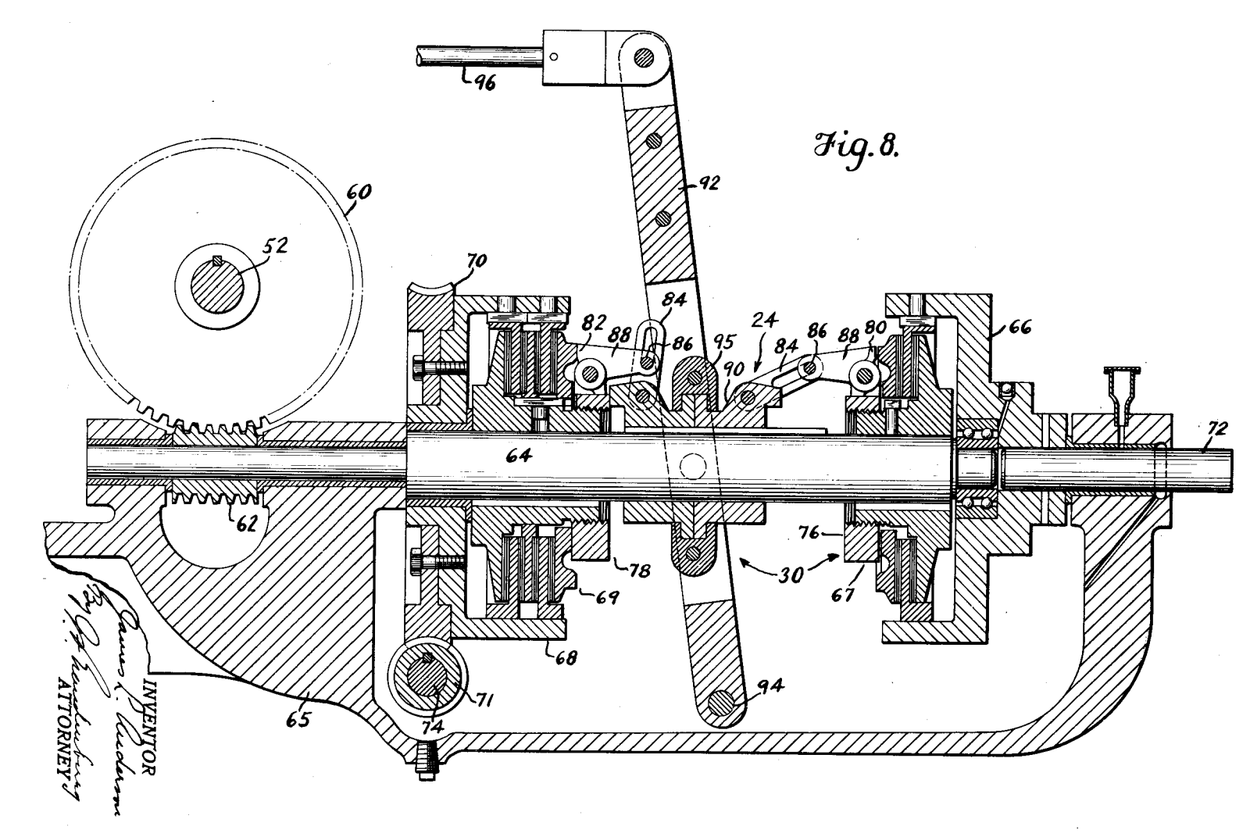
Fig. 8 is a longitudinal sectional view on the line 8—8 of Fig. 6 of the clutch casing and the clutches therein assembled.

Shaft 52 is carried in a bearing, which may be integrally cast with base 38, and has a worm gear 60 secured thereto. The worm gear engages a worm 62 which is mounted upon the main drive shaft 64. Shaft 64 is journaled in one wall of a clutch casing 65, the end of the shaft being journaled in a portion 66 of the clutch 67. Portion 66 is secured directly to the end of the motor shaft 72 of the high speed motor 26, the shaft being journaled in a wall of the clutch casing, against which portion 66 is mounted to fix the position of said shaft.

Loosely mounted on shaft 64 is the clutch portion 68 of the clutch 69, to which is secured the worm gear 70. Gear 70 is driven by the worm 71 carried upon the motor shaft 74 of the low speed motor. Shaft 74 is suitably journaled in the walls of the clutch casing. Keyed to the shaft 64 and permitted longitudinal movement thereon are the complementary portions 76 and 78 of clutches 67 and 69, assembled with the respective portions 66 and 68. By means of the presser feet 80 and 82, portion 76 may be forced into engagement with portion 66, or portion 78 with portion 68, at the instance of the operator, thus coupling either the high speed or the low speed motor to shaft 64. The presser feet are pivotally mounted upon their respective portions 76 and 78. A pair of slotted links 84 slidably engage over pins 86 on fingers 88 extending from said feet. The links are fixedly pivoted upon a collar 90 keyed to but slidable along shaft 64. A lever 92 pivoted at 94 to the clutch casing has sliding pivot engagement with a pin on a ring 95 encompassing collar 90 and within which said collar may rotate. The lever is pivotally connected to a rod 96, at the outer end of which a pivot connection is made with one end of a hand lever 98, pivotally supported upon an upright 100 secured to base 38. When lever 98 is moved, portions 76 and 78 will be actuated to couple the proper motor to the drive shaft, or in the neutral position of said lever to release both motors from drive engagement with said shaft. The proper reduction in speed is had through the systems of gearing employed. Both clutches are preferably of the disk type, and therefore permit considerable relative sliding of the contact portions before the completion of the coupling action. The slipping effectuates a braking action, facilitating the reduction of speed of one shaft to that of another before the coupling is completed.

In the use of two distinct motors for obtaining two distinct speed ratios, the problem of time loss in changing from one speed to another by means of a gear shift has been overcome. When the high speed motor is in use, it is intended that the torch applying its flame to the pipe at the seam to be closed will heat that portion to a temperature sufficiently below the welding point that fusion will not take place. It is desired that the metal be heated so that the subsequent welding operation may be more quickly carried forward, because of the initially hot metal, and that the effects of a small, highly heated area and a large cold area in producing extreme expansive stresses may be substantially eliminated. In changing from this high preheating speed to the relatively low speed at which the weld is made, it is necessary to avoid reduction to a speed at which heat provided for preheating the metal will be lost, as where the pipe remains practically stationary. A gear shifting arrangement necessarily would require a time loss, as either the pipe would be brought to a standstill before the low speed motor device would become active or damage to the gears would result from making driving connection at relatively high speed with a large mass of metal moving with considerable momentum. Likewise, danger of damage to the low speed motor from the shock of applying the force resulting from the inertia of this large mass of moving pipe must be avoided. The reduction in speed contemplated is about 90%, and for this reason even though the speeds resulting are relatively low in figures, yet in relation to motor speeds and gear speeds the ratios are very high. Another factor supporting a two motor drive lies in the high price of gear installations as compared with the costs of motor installations.

High speed motor 26 may if desired have a control box provided therefor; in preferred cases merely a switch and starting rheostat are necessary, since the speed of preheating is not intended to be accurately maintained. However, for low speed welding motor 28 it is necessary to provide some means for closely regulating the speed at which the seam moves past the welding torch. For this purpose the drum controller 108 is secured to base 38 at the side where the operator normally stands. The control handle 110 is thus made readily accessible to him for varying the speed of rotation of the pipe. The drum controller may be of any preferred variety, its particular construction having no special relation to the invention herein.

It is to be noted that for field use, where economy of space and of weight to be transported are factors, the preheating motor may be dispensed with. In such cases apparatus for reducing the speed of the one motor used, either mechanically as by gearing or by rheostatic control, or by an adjustable make-and-break speed governor, may be resorted to.

In order to get the pipe sections from the conveyor 39, through cylinder 44, thereafter to support them during the welding operation, and to facilitate the subsequent removal from the welding machine, a roller system carried in the roller supports 20 is provided. The roller supports are located either on base 38 or on individual sections thereof in alignment with said base. Said supports have assembled therewith a plurality of transversely extending rollers 112 and a number of longitudinally extending rollers 114. For movement of pipe sections into and through chucks 46, it is preferable to move rollers 114 to inoperative position, to reduce the friction of this sliding movement. In like manner, when the pipe sections are being revolved by the chucks, it is desirable that rollers 112 be out of contact with the sections in order that the rotative movement be free. This object is accomplished by moving out of position one set only of the rollers, the other rollers being fixed in position. To assure accurate alignment of the pipe sections during the welding operation, rollers 112 only are moved, the rollers 114 being accurately aligned and substantially fixed in position so that the sections supported thereby will be maintained in alignment with chucks 46. However, rollers 114 are preferably carried in cradles 115 which may be raised or lowered whenever the welding machine W is being set up for a size of pipe different from that last handled. Ordinary blocks or wedges and/or a bar, secured to the cradle and retained in position by means of a set-screw or the like, may be used in securing the proper elevation of the cradles.

Rollers 112 are mounted on slides 116, carried in grooves 118 cut in heads 120, which are secured to base 38 or some similar aligned part. The slides are connected to a cross-head 122, which in turn has a swiveling connection with an adjusting screw 124. The screw is threaded through a worm gear 126 resting upon a cross-bar of the base. Carried between bearings on base 38 is a worm 128, engaging gear 126. The worm is mounted upon a longitudinally extending shaft 132, supported in a bracket 130. By means of a pair of bevel gears 134 and a shaft 136, the hand wheel 138 located in proximity to the position of the operator is made operative to actuate worm and worm gear, so that the slides will be moved up and down in grooves 118, and rollers 112 thereby adjusted with relation to the pipe section 10.

A modification of the means for adjusting rollers 112 may be embodied in a hydraulically operated plunger connected directly to the head 120. The wheel 138 may then be replaced by the valve of a hydraulic system. The plungers will be actuated to move the rollers into position against the pipe, or will be permitted to fall by gravity away from the pipe. For field use the worm and gear arrangement or the hydraulic apparatus may not be practicable, and therefore a rod moved by means of a gear-actuated rack, operated by a ratchet and pawl through a hand lever, may be used to raise and lower rollers 112.

With rollers 112 positioned in the raised position, pipe sections 10 tacked together at the tacking table T are conveyed to the welding machine W over the conveyor 39, and by means of rollers 112 up to chucks 46. These chucks are opened by the adjusting means provided, and the pipe sections passed through them and the cylinder 44 until a seam 36 is approximately located at the welding device. Rollers 112 are dropped, and the pipe sections now will be supported upon rollers 114. The chucks are closed and the apparatus is ready for the welding operation.

Figure 9:
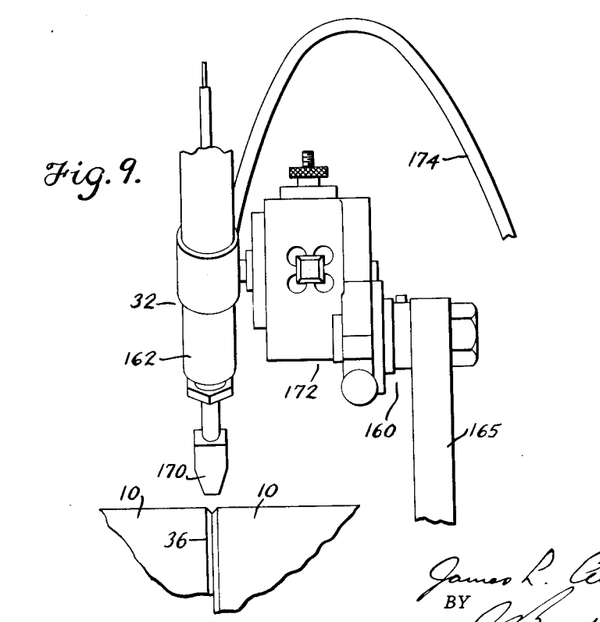
Fig. 9 is an enlarged detail elevational view of the torch and the adjusting mechanism therefor.

The welding unit 32 is carried upon a section 140 of base 38, which may be cast integrally therewith or be made as a separate portion, in alignment therewith. Section 140 has an upper surface formed as a bed 142, upon which guides 144 have been machined or otherwise produced. Riding over guides 144 is the transverse base 146 for the carriage 34. By the engagement of a gear 148, carried by base 146, with a rack 150 cut in bed 142, the base may be moved longitudinally of the pipe sections held in the chucks. A hand wheel 152 is provided for the actuation of this adjusting mechanism.

Upon the upper surface of base 146 is machined a guide 151, which is received within a groove 153 cut in the foot 154 of the L-shaped standard 155. A boss 156 may be formed on base 146; an opening therethrough provides a bearing for a worm or screw 157 which extends through a recess 158 cut through the upper face of guide 151. A nut 159, formed with foot 154 and traveling through recess 158, is engaged by screw 157, so that as the hand wheel 161 adjacent the hand wheel 152 is rotated, the torch and its assembled apparatus may be adjusted transversely of the pipe section and parallel to the seam.

By this adjustment is made practicable the welding of pipe of different diameters upon the same apparatus. In welding a seam such as the circumferential seam here specifically dealt with, the factors of maintaining a substantially fluid mass upon a rotating cylindrical body, those of speed of rotation, length of the metallic puddle, rate of cooling, viscosity of the molten metal and its surface tension in the molten state, all figure in determining the proper position for the torch tip while welding is proceeding. The adjustment through hand wheel 161 permits ready compensation for all these factors while the welding operation is carried forward.

The upright 163 of the L-shaped standard 155 has secured at the upper end thereof an arm 165. A releasable connection between arm 165 and upright 163 permits swinging arm 165 toward and away from the pipe sections. At the outer end of arm 165 there is assembled the bracket arm 160 upon which the torch 162 is carried. The bracket arm preferably carries an adjusting mechanism 172, of the type shown in my Patent No. 1,371,540, dated March 15, 1921, for the purpose of adjusting the position of the torch tip 170 both longitudinally of the pipe section, and vertically with relation to the seam, during the welding operation. After the coarse adjustment of the pipe sections in the chucks, the hand wheel 152 is manipulated to bring the welding device closely over the seam to be welded. Final accurate adjustment is accomplished by means of mechanism 172.

The torch 162 may take any desired form for this apparatus assembly, but preferably the tip 170 is constructed to deliver a multiple jet flame, as indicated in my Patent No. 1,516,486, dated November 25, 1924. It may be provided with water cooling means and preferably has a wire feeding outlet, as described in my said patent and my Patent No. 1,438,285, dated December 12, 1922. A flexible tube 174 provides a conduit leading from the wire feeding mechanism 176 to this outlet. The wire feeding mechanism is supported upon a bracket 178, carried upon standard 155, and is located so that the heat from torch 162 will not affect the electrical and mechanical parts thereof. The drive for mechanism 176 is preferably embodied in a motor 180, having a suitable governor, the adjustment of which is effected through a knob 184. An operator of the apparatus has ready access to this knob to control the amount of wire fed to the torch as the welding operation proceeds. Wire may be fed to the mechanism 176 in any preferred manner.

In the operation of the apparatus herein described, pipe sections are rolled from the storage racks S to the tacking table T, down along the runway 12, and are positioned on the rollers 25. The pipe sections are brought into abutment with their metallic body portions aligned. Then, either by a hand torch, or by any other suitable device, the abutting ends are welded at widely separated points to integrally bond them together. The tacked sections will then be transferred to conveyor 39, and thence to the rollers 112. After the proper manipulation of hand wheel 138, rollers 112 will support the sections, which are rolled through the open chucks 46, and a seam 36 roughly positioned beneath the tip 170. The rollers 112 are dropped, and the chucks tightened; the pipe sections are then supported entirely by rollers 114 and chucks 46. Both motors are now placed in operation and lever 92 is moved to couple the high speed motor 26 to drive the chucks. The torch 162 is ignited, and wheels 152 and 161 and mechanism 172 utilized to position tip 170 directly over the seam. The chucks are permitted to rotate the pipe sections for a predetermined time until the metal is practically at a dull red heat. Then, by quickly shifting, by means of lever 92 to the drive from the low speed motor 28, the speed of section 10 is cut down to the welding speed, the disks of the clutches operating as brakes to relieve the connections to motor 26 from any appreciable torque. The wire feeding mechanism 176 is, if it is desired, immediately made operative, and the rate of the wire feed controlled by means of knob 184. The welding operation now continues for the complete rotation of the chucks, after which the torch may be moved out of operative position by the use of mechanism 172, which has been utilized during the operation to compensate for small variations in the seam position as rotation took place. During the welding operation, rollers 114 have continuously operated to resist bowing of the pipe sections and positively to straighten the sections when any bowing did take place. Now the sections may be permitted to continue rotation, while the welding flames are ineffective, to completely straighten the pipe. After rotation is stopped, rollers 112 are raised against the pipe sections, after releasing said sections from the chucks. The sections may now be pushed through the open chucks, being carried by the rollers 112. Suitable conveyors may be provided at the delivery end of the chucks to permit the ready removal of the welded sections. These conveyors may be made up of rollers of the same type as the rollers 112 on the entry side of the welding machine.

The welding machine may be arranged to produce a continuous pipe by proper association of a series of rollers 112 on both the entry and the delivery sides of the pipe sections. In such case, pipe sections may be tacked together externally of the welding machine or may be so bonded while one of the sections is retained in the chucks. In either case, the unclamped sections will be supported upon set of rollers 114 during the welding operation. Then, when welding of a seam is completed, the chucks are released after rollers 112 have been raised into position under each section not in the chucks. The aligned sections may now be pushed through the chucks until another unwelded seam or edge is brought under the welding torch or torches. The adjustment of the chucks and rollers is repeated and welding commenced. In this manner, it is possible to move away from the welding machine almost indefinite lengths of pipe, all parts of which are substantially integral. This method makes possible the production of a unitary pipe from a plurality of sections in the field, where the welding machine is preferably mounted on skids for ready transportation, a set of rollers 112 and 114 being located at each end of the machine. Other sets of rollers 112 and 114 may be positioned in alignment with the chucks of the welding machine to receive the discharged pipe. Pipe sections are fed to the machine as the continuous pipe manufactured is moved away from the machine over rollers 112 down to the ditch, which may have been provided for such pipe line.

It is to be noted that the controls for the motors, clutch, the rollers and the torch are so located as to be within arm's length of an operator of the apparatus, thus facilitating quick changes which are necessary in the exact operation of maintaining a welding heat at the seam between the sections.

It is also contemplated to arrange apparatus of the type herein described in which a plurality of torches, arranged upon separate sections 140, may be simultaneously operated, the welds closed, and a plurality of seams formed between the aligned sections.

The description has been of the specific steps necessary to produce all the results desired, and also of a specific apparatus for carrying out the entire process. I, however, do not limit myself to the whole invention as disclosed, but intend to lay claim to all the individual steps, sub-combinations of steps, or sub-combinations of apparatus to which I may be entitled.

I claim:

1. In the method of welding together, in a continuous tube, a plurality of tube sections, the steps of butting aligned sections against each other, tack welding the adjacent edges of said sections, applying a high temperature flame to the metal along the margins of said edges, and applying rotative power directly to one only of said sections to produce first a speed of relatively high proportions and thereafter a speed of relatively low proportions.

2. In the art of welding circumferential seams, the steps of fusing together the metal of the members to be united at one or more separated points along the edges forming the seam, and then rotating the members to move the margins of the seam past a welding device, first to preheat the metal by rotating at a speed sufficient to prevent fusion of the metal, and thereafter rotating at a speed sufficient to permit fusion of the metal.

3. Apparatus for welding sections of pipe or tubing in end to end relation, comprising means for clampingly engaging a section of tubing, means for driving said engaging means, said driving means including a double motor arrangement to propel said engaging means at a plurality of speeds, means to control the operation of said driving means, said controlling means having a braking action during the change of speeds, and high temperature heating means mounted relatively to said pipe ends.

4. Apparatus for welding sections of pipe or tubing in end to end relation, comprising means for retaining a section of tubing, means for driving said engaging means comprising apparatus for producing various speeds of said retaining means, means for freely supporting another pipe section in end abutting position relative to said first pipe section, and means to heat said abutting ends to a high temperature when said retaining means is driven at a relatively high rate of speed and to a fusing temperature when said retaining means rotates at a relatively low rate of speed.

5. Apparatus for welding sections of pipe or tubing in end to end relation, comprising means for retaining a section of tubing, means for driving said retaining means, comprising apparatus for producing various speeds of said retaining means, means for freely supporting another pipe section in end abutting position relative to said first pipe section, and means to weld said abutting ends together while said driving means is operative.

6. In mechanical welding apparatus for welding together two portions of pipe, tubing, or the like, comprising a plurality of gripping devices to engage one portion, means external to said devices for supporting another portion for free movement thereon, welding means mounted relatively to, and externally of said gripping devices, and means for rotating said devices.

7. In mechanical welding apparatus for uniting two aligned pipe sections of substantially the same diameter, a chuck for gripping one of said sections, means for supporting the other section so that it is free to move lengthwise as the result of expansion, means for rotating said chuck, and means for fusing the seam edges together as the chuck is rotated.

8. In a process of fabricating lengths of pipe from sections of substantially the same diameter, the steps of aligning the sections in end to end abutment, then welding the sections together at a plurality of spaced points along the abutting edges, then gripping one section so that it is fixed except as to rotation and firmly supporting the other section so as to preserve alignment while permitting said section to move lengthwise as the result of expansion, and finally fusing together the metal at the abutting ends to close the seam therebetween while rotating the gripped section.

9. In a process of fabricating lengths of pipe from sections of substantially the same diameter, the steps of aligning the sections in end to end abutment, then welding the sections together at a plurality of spaced points along the abutting edges, then gripping one section only and supporting the sections so that when rotated and heated the alignment thereof will be maintained, and finally fusing together the metal at the abutting ends to close the seam therebetween while continuously rotating the gripped section.

10. A process of welding a plurality of pipe sections into a continuous member which consists of bringing said sections into alignment and abutment; tacking said sections at contiguous edges; clamping one of said sections; and rotating all of said sections and applying a fusing heat along the seam edges between said sections, while continuously restraining said unclamped sections against movement out of alignment with said clamped section.

11. A process of welding a plurality of pipe sections into a continuous member which consists of bringing said sections into alignment and abutment, tacking said sections at contiguous edges, clamping one of said sections and freely supporting the remainder to permit rotation thereof together with said clamped section, applying fusing heat along seam edges between said sections while rotating the clamps, and continuously forcing the freely supported remainder into alignment with said clamped section.

12. The process of welding together a plurality of pipe or tube sections to produce a continuous member which comprises the steps of bringing the sections into alignment and the end edges thereof into abutment, moving the seam so formed past a metal fusing device located over the seam, and so adjusting the speed of said seam past the metal fusing device and the position of said device relative to the crest of the seam that melted metal will flow down along the seam and congeal to form the weld at the side of the crest where the surface of the pipe is moving downwardly during the welding operation.

13. The process of welding circumferential seams in metallic members which consists of disposing the seam in a plane substantially vertical, then moving the seam past a heating means for progressively bringing the seam edges to fusion, and governing the position of the heating means with relation to the crest of said seam so that metal fused from said seam in a region adjacent to the crest, at and before the same, will be carried beyond the point of fusion to the downwardly moving seam portion and there congeal to weld the seam closed.

14. The process of welding circumferential seams in metallic members which consists of disposing the seam in a plane substantially vertical, then moving the seam past a heating means for progressively bringing the seam edges to fusion, and governing the position of the heating means with relation to the crest of said seam so that metal fused from said seam will move along the seam beyond the point of fusion to congeal and weld the seam closed, said fusion taking place preferably in a region at and before the crest and said congealing taking place in a region at and after the crest.

15. The process of welding circumferential seams in metallic members which consists of the steps of moving the seam past means for heating the seam edges to fusion temperature, and regulating the speed of movement of said seam past said means so that metal, melted from said seam edges on the ascending side of the seam, will move along the seam to a point of congelation spaced away from the point of fusion, on the descending side of the seam.

16. The process of welding together a plurality of pipe or tube sections to produce a continuous member, comprising the steps of bringing the end edges of the sections into abutment, rotating the sections, raising the metal along the seam edges to fusion temperature, and regulating the position at which the metal fuses with relation to speed of rotation so that melted metal will move along the seam from the crest toward the downgoing side of the pipe before congealing a short distance below the crest to weld the edges together.

17. The process of welding circumferential seams in metallic members which consists of disposing the seam in a plane substantially vertical, then moving the seam past a heating means for progressively bringing the seam edges to fusion, fusing additional metal into the seam other than from said edges and governing the position of the heating means with relation to the crest of said seam and the movement of said seam past said heating means so that the fused metal will be transferred to a position beyond the point at which it fused before it congeals to weld the seam closed, and effecting substantially the entire fusion and congelation upon those portions of the seam substantially horizontal and having a slight inclination to the horizontal.

18. The process of welding circumferential seams in metallic members which consists of disposing the seam in a plane substantially vertical, then moving the seam past a heating means for progressively bringing the seam edges to fusion, fusing additional metal into the seam other than from said edges, and governing the position of the heating means slightly before the crest of said seam so that the fused metal will be transferred to a position at and beyond the point at which it fused before it congeals to weld the crest away from the seam closed.

19. The process of welding together a plurality of pipe or tube sections to produce a continuous member which comprises the steps of bringing the sections into substantially horizontal alignment and the end edges thereof into abutment, moving the seam between the abutting edges past a metal fusing device located to heat the metal at the approximate upper crest of said seam, and regulating the speed of said seam past the metal fusing device and the position of said device longitudinally of said seam so that metal melted by said device will flow along the seam away from the place of fusion to solidify and form a weld on the downwardly moving side of said sections.

20. In apparatus for welding substantially vertically disposed circumferential seams, means for engaging the portions between which the circumferential seam to be welded is formed, means for rotating the engaging means, and a device for fusing metal positioned approximately at the topmost portion of said seam, said device being positionable relative to said topmost portion to effect congelation of the fused metal on the downgoing portion of said seam.

21. In apparatus for welding substantially vertically disposed circumferential seams, means for rotating the portions between which the circumferential seam to be welded is formed, and an elongated device for preheating and fusing metal positioned at said seam, said device being positionable with the initial preheating portion thereof over the ascending side of the seam and the final fusing portion over the seam adjacent the crest to effect congelation of the fused metal on the downgoing portion of said seam.

22. A method of welding seams in curving surfaces of metallic members, which includes the steps of: bringing the metal, at a localized area at the crest of the seam, to fusion temperature, and effecting movement of such area along the seam while maintaining such area substantially in constant relation to the crest of movement of such seam, the relation of the area to the crest being such that molten metal formed at such area will be carried beyond the crest of movement and then will congeal to form a weld of predetermined cross-section.

23. A method of welding seams in curving surfaces of metallic members, which includes the steps of: bringing the metal, at a localized area on an upwardly moving portion of the seam, to fusion temperature, and effecting movement of such area along the seam while maintaining such area substantially in constant relation to the crest of movement of such seam, the relation of the area to the crest being such that molten metal formed at such area will be carried beyond the crest of movement and then will congeal to form a weld of predetermined cross-section.

24. A method of welding seams in curving surfaces of metallic members, which includes the steps of: heating the metal to fusion by means of a high temperature flame jet acting at a predetermined area of the seam, and effecting movement of such jet along the seam while maintaining such area substantially in constant relation to the crest of movement of such seam, the relation of the area to the crest being such that molten metal formed at such area will be carried beyond the crest of movement and then will congeal to form a weld of predetermined cross-section.

25. A method of welding seams in curving surfaces of metallic members, which includes the steps of: heating the metal to fusion by means of a plurality of high temperature flame jets, acting at a predetermined area of the seam, and effecting movement of such jets along the seam while maintaining such area substantially in constant relation to the crest of movement of such seam, the relation of the area to the crest being such that molten metal formed at such area will be carried beyond the crest of movement and then will congeal to form a weld of predetermined cross-section.

26. Apparatus for welding sections of pipe or tubing in end to end relation, comprising means for clampingly engaging a section of tubing, means for driving said engaging means, said driving means being constructed to propel said engaging means with a plurality of speeds, and friction clutch means to control the operation of said driving means, and high temperature heating means mounted relatively to said pipe ends.

JAMES L. ANDERSON.